United States Patent
Stuler et al.

(10) Patent No.: US 9,564,817 B2
(45) Date of Patent: Feb. 7, 2017

(54) METHOD AND APPARATUS FOR DEDICATED SKIP MODE FOR RESONANT CONVERTERS

(71) Applicant: Semiconductor Components Industries, LLC, Phoenix, AZ (US)

(72) Inventors: Roman Stuler, Karolinka (CZ); Vaclav Drda, Valasska Bystrice (CZ); Pavel Latal, Roznov Pod Radhostem (CZ)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 249 days.

(21) Appl. No.: 14/216,590

(22) Filed: Mar. 17, 2014

(65) Prior Publication Data

US 2015/0263629 A1 Sep. 17, 2015

(51) Int. Cl.
*H02M 3/335* (2006.01)
*H02M 3/337* (2006.01)
*H02M 1/00* (2006.01)

(52) U.S. Cl.
CPC ....... *H02M 3/33546* (2013.01); *H02M 3/3376* (2013.01); *H02M 2001/0032* (2013.01); *H02M 2001/0058* (2013.01); *Y02B 70/1433* (2013.01); *Y02B 70/1491* (2013.01); *Y02B 70/16* (2013.01)

(58) Field of Classification Search
CPC ............. H02M 2001/0032; H02M 2001/0058; H02M 3/33507; H02M 3/33515; H02M 3/33546; Y02B 70/1433; Y02B 70/1491; Y02B 70/16; Y02B 70/126
See application file for complete search history.

(56) References Cited

U.S. PATENT DOCUMENTS

| | | | |
|---|---|---|---|
| 6,906,500 B2* | 6/2005 | Kernahan | H02M 3/157 323/225 |
| 2004/0114398 A1* | 6/2004 | Lipcsei | H02M 1/088 363/41 |
| 2008/0224681 A1* | 9/2008 | Padure | H02M 3/1588 323/288 |

(Continued)

OTHER PUBLICATIONS

ON Semiconductor: NCP1397A, NCP1397B "High Performance Resonant Mode Controller with Integrated High-Voltage Drivers"; Publication Order # NCP1397/D; Nov. 2011.

(Continued)

*Primary Examiner* — Adolf Berhane
*Assistant Examiner* — Henry Lee, III
(74) *Attorney, Agent, or Firm* — Robert F. Hightower

(57) ABSTRACT

A method and semiconductor device for controlling skip mode operation during light load conditions in a resonant power converter includes a skip mode controller circuit that compares a feedback signal corresponding to the secondary output level with a reference voltage to determine when to invoke skip mode. When entering skip mode the skip mode controller ceases switching by turning on the lower switch for a prolonged time to leave the resonant capacitor partially charged. Upon resuming switching, the lower switch is turned on first to drive current through the inductances, and asymmetric switching is used where the upper switch is on, initially for shorter periods to allow zero voltage switching. If the load increases, the on-time of upper and lower switches converge and conventional symmetric switching resumes.

16 Claims, 8 Drawing Sheets

(56) References Cited

U.S. PATENT DOCUMENTS

2009/0046487 A1* 2/2009 Emira ............... H02M 3/158
363/78
2011/0085354 A1* 4/2011 Wang ............... H02M 1/4225
363/21.02

OTHER PUBLICATIONS

ST: DAP020A "DAP020A Introduction"; Aug. 2012.

* cited by examiner

METHOD AND APPARATUS FOR DEDICATED SKIP MODE FOR RESONANT CONVERTERS

FIELD OF THE DISCLOSURE

The present disclosure relates generally to circuits, devices, and methods for electrical power conversion and regulation using switched mode resonant power conversion, and more particularly to reducing switching losses when using skip techniques under light or no load conditions in resonant converters.

BACKGROUND

Switch mode power supplies are used in a wide variety of household and industrial appliances that require a regulated direct current (DC) voltage for their operation. There are a wide variety of known DC-DC converter topologies using PWM (pulse width modulation) or PFM (pulse frequency modulation) control to regulate output voltage.

One type of DC-DC converter topology is a resonant switched mode power converter. A resonant converter included in a resonant switched mode power converter controller with PFM utilizes resonant properties to provide natural soft switching in a closed loop to regulate the output. A resonant converter using PFM senses the power supply output and controls it by varying the switching frequency. An advantage of a resonant converter with PFM is that with the natural soft switching, there is reduced switching loss compared to non-resonant power converter topologies. Another advantage is that resonant converter with PFM can be designed to operate with higher frequencies in a smaller package sizes.

Among a variety of resonant switched mode power converters are high frequency (HF) transformer isolated LLC converters, which have become increasingly popular in recent years. LLC resonant converters utilize the resonance between two inductors and a capacitor to provide natural soft switching. LLC resonant converters save on cost and size by utilizing the magnetizing and leakage inductance of the HF transformer as part of their resonance components. One disadvantage of some resonant converters is that the required wide range of frequency control result in more complicated electromagnetic interference (EMI) filter designs. However, with the gain characteristics of LLC resonant converters, output regulation can be achieved with a narrow band of frequency control.

To interface with low frequency (e.g. 60 or 50 Hz) alternating current (AC) networks, DC-DC LLC resonant converters require an AC-DC front stage. With continuing efforts to conserve energy, there are increasingly tighter obligatory standards for the overall efficiency, low load/no load and standby power consumption in power converters.

One known method for reducing power loss at low load and no load conditions in LLC resonant converters is a mode of operation commonly known as skip or burst mode, which involves ceasing the switching activity for periods of time during the low load and no load conditions. Essentially, switching of the power switches is ceased for periods, allowing the output voltage to fall slightly, and then switching is momentarily resumed to refresh the output voltage in a "burst." Thus, there are periodic or occasional bursts of switching activity during low or no load conditions. However, known LLC resonant converters having a skip or burst mode simply cease switching and resume switching without any consideration for the state of the primary circuit. Given that the resonant capacitor can be at a random state of charge, simply resuming switching operation can result in high current transients through the switches, rather than the typical soft switching of normal operation for resonant converters.

Accordingly, there is a need for a method and apparatus for reducing switching losses when resuming switch operation in skip mode under light load conditions in a resonant converter.

BRIEF DESCRIPTION OF THE FIGURES

In the accompanying figures like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

Figure 1:
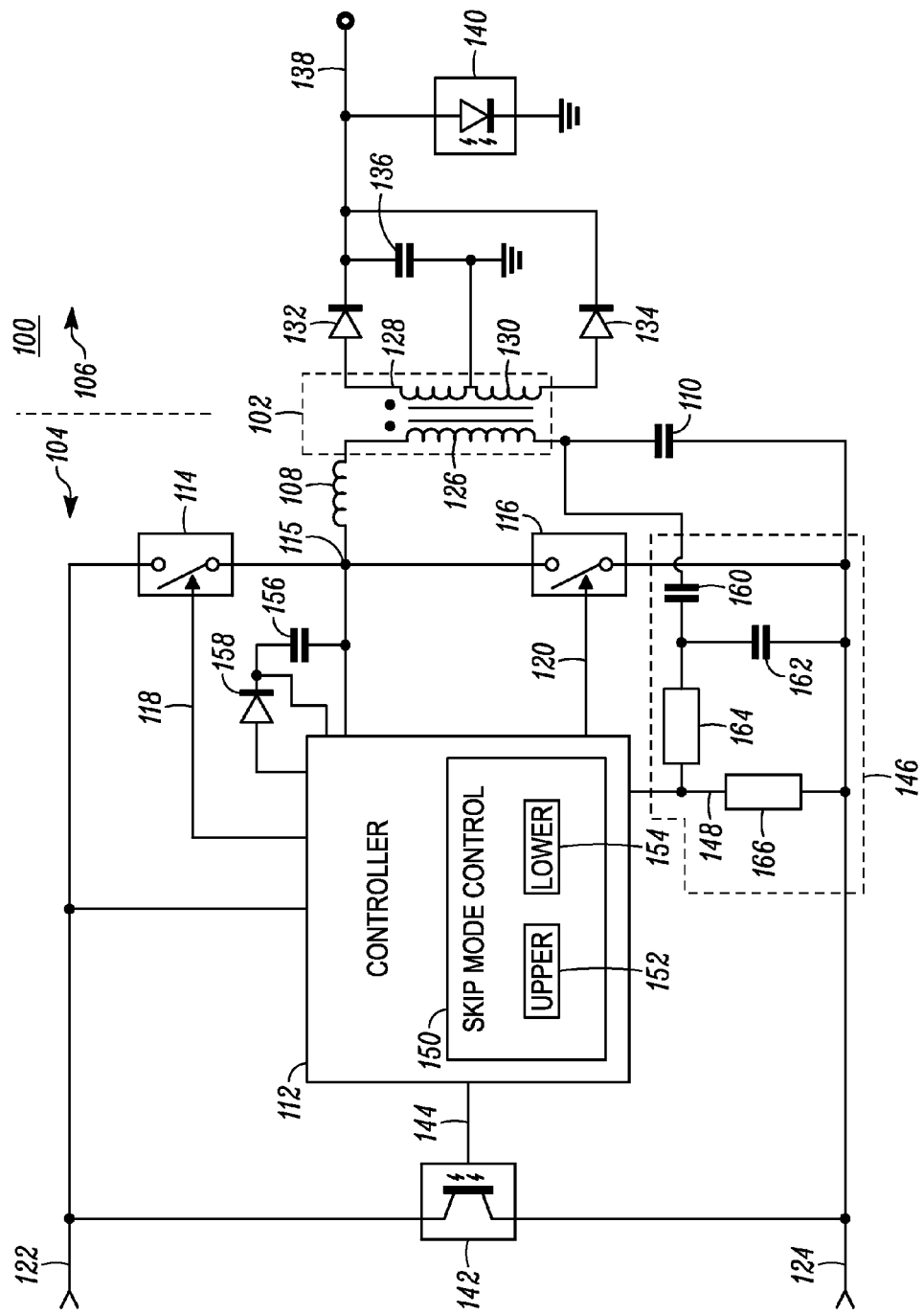
FIG. 1 is a block diagram of a LLC resonant converter including a controller, in accordance with some embodiments.

Those skilled in the field of the present disclosure will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Well known elements, structure, or processes that would be necessary to practice the invention, and that would be well known to those of skill in the art, are not necessarily shown and should be assumed to be present unless otherwise indicated. Common terms are carried forward throughout the following description, and refer to substantially similar subject matter, even if not commonly numbered for reference in particular drawings.

DETAILED DESCRIPTION

Embodiments of the disclosure include a circuit for a controller, and a method of operating a controller for an LLC resonant converter. The LLC resonant converter includes an upper switch coupled between a high voltage input and a half bridge node, a lower switch coupled between the half bridge node and an input ground, and a resonant inductor, magnetizing inductor, and resonant capacitor coupled in series between the half bridge node and the input ground. The method includes receiving, at the controller, a feedback signal from a secondary side of the LLC resonant converter that indicates a level of an output voltage. The method further includes initiating a skip sequence responsive to the feedback voltage indicating that the output voltage has cross a skip-in threshold. The skip sequence includes ending switching by driving the lower switch on for an extended period, relative to a recent on-time for the upper switch, to charge the resonant capacitor to a fraction of the high voltage input, and shutting off the lower and upper switches. The method further includes resuming switching, responsive to the feedback voltage indicating that the output voltage has cross a skip-out threshold, by driving the lower switch on first for the extended period of time and then alternately switching the upper and lower switches.

FIG. 1 is a block diagram of a LLC resonant converter 100 including a controller 112, in accordance with some embodiments. In general, the resonant converter 100 is configured in a half bridge topology, using a transformer 102 to isolate a primary side 104 from a secondary side 106. A resonant inductance 108 is connected in series with a magnetizing inductance 126, such as a primary winding of the transformer 102. The resonant inductance 108 and magnetizing inductance 126 are further connected in series with a resonant capacitance 110 between the half bridge node 115 and the input ground 124. The resonant inductance 108 can be a parasitic inductance of the transformer 102. The controller 112 operates a pair of switches including an upper switch 114 and a lower switch 116. The upper switch 114 is operatively connected between a DC line voltage input 122 and the half bridge node 115. The lower switch 116 is operatively connected between the half bridge node 115 and an input ground 124. The controller 112 provides an upper switch drive signal on line 118 to the upper switch 114 to turn the upper switch on (conducting) or off (non-conducting). Likewise, the controller 112 provides a lower switch drive signal on line 120 to the lower switch 116 to turn it on or off. The upper and lower switches 114, 116 can be alternatively switched in a non-overlapping manner, which means there is always a short time period between shutting one switch off and turning the other switch on, and vice versa.

The secondary side 106, generally, receives energy from the primary side 104 and provides an output, as well as feedback to the primary side so that the output can be regulated to a desired level. In some embodiments two secondary windings 128, 130 are provided in the secondary side 106 of the transformer 102. Each of the secondary windings 128, 130 are coupled to a respective rectifier 132, 134, which both feed into an output capacitor 136. The voltage across the output capacitor 136 is provided at output 138.

Feedback to the primary side 104 can be accomplished using, for example, and opto-isolator which has, on the secondary side 106, a light producing circuit 140 that produces light having an intensity that varies with the output level at output 138. On the primary side 104, the opto-isolator includes a light receiving component 142, that produces a feedback signal 144 that varies with the intensity of the light output by the light producing circuit 140, and which is fed to the controller 112. The controller 112 is further provided with a current sense signal 148 that is provided by a current sense circuit 146 which senses current through the primary winding 126. The current sense signal is derived from the voltage across the resonant capacitor 110 which is divided across capacitors 160 and 162, which are connected in series together, in parallel with the resonant capacitor 110. A voltage divider comprised of resistors 164 and 166 are coupled in series together, and in parallel with capacitor 162. The current sense signal 148 is provided at the junction of the divider resistors 164, 166.

The controller 112 can be implemented as an integrated circuit device in a unitary package with terminals extending out of the package for making electrical connections with other circuit elements and conductors. The controller 112 provides drive signals for both the upper and lower switches 114, 116, and receives feedback signal 144 and current sense signal 148 to control timing and duration of the drive signals. For light or no load conditions at the output 138, the controller 112 includes a skip mode control circuit 150 that controls the switching shut down sequence and the sequence for resuming switching during skip mode operation. As used here, the term skip mode refers to a mode of operation where there is a low, or no load condition at the output 138, and in response the controller shuts off switching and periodically resumes switching for a "burst" for a short time to refresh the output level. In a resonant converter operated using zero voltage switching (ZVS) operation, as the load is reduced, the switching frequency increases. The switching generally maintains equal on-times and equal off times between the upper and lower switches 114, 116, which is referred to herein as symmetric operation. However, given the DC gain of the resonant LLC circuit of the resonant inductance 108, magnetizing inductance 126, and resonant capacitor 110, large changes in frequency under low load conditions are necessary to maintain regulation of the output 138. To avoid such conditions, skip mode is used where the switching is momentarily ceased, and then resumed occasionally in a burst, or skip burst. The periodic shut off and burst pattern is repeated during light or no load conditions. The skip mode control circuit 150 detects low load conditions based on the feedback signal 144 to determine when to enter skip mode, initiate a burst, and resume normal or non-skip operation (e.g. when the load increases).

Upon detecting a skip mode condition, based on the feedback signal 144 indicating the output 138 has crossed a skip-in threshold, the controller 112 undertakes or initiates a switching shutdown sequence where the upper switch 114 is shut off in the course of alternate switching operation, then the lower switch 116 is turned on for an extended period and then shut off. The skip-in threshold corresponds to an upper limit at the output that correlates with a low or no load condition. The skip mode control circuit 150 determines an upper on-time 152 and a lower on-time 154 for the upper and lower switches 114, 116, respectively, based in part on the current sense signal 148. The upper and lower on-times 152, 154 can be maintained separately and timed using separate counters (timers), or they can be measured by one up/down counter. When the skip mode is triggered by the output crossing the skip-in threshold, it is detected during an on-time of the upper switch 114, and the lower on-time 154 for the next subsequent lower switch on time is then increased, such as by a factor of 50% (3/2) of the upper on-time 152. It should be noted that since the output was approaching the skip-in threshold during symmetric switching operation, the on-times used just prior to entering skip mode will be substantially that of the maximum switching frequency. Leaving the lower switch 116 on last for the extended period allows the resonant capacitor 110 to discharge to a DC level that is some fraction of the input voltage (between inputs 122 and 124). In some embodiments the switching is controlled such that the resonant capacitor is discharged to about 25% of the input voltage. Once the lower switch 116 is shut off, switching is ceased until the feedback signal 144 indicates the output 138 has crossed a skip-out threshold that corresponds to an output level indicating the output level needs to be refreshed. Both the skip-in and skip-out thresholds can be chosen for the particular application by the designers of the resonant power converter 100.

When switching is resumed by the controller 112, such as in response to the skip-out threshold being crossed, again a particular switching sequence is used. The lower switch 116 is turned on first, and for a period of time that is increased over the last turn on-time used for the upper switch 114, which can be the same as the most previous on-time of the lower switch used to discharge the resonant capacitor 110. When the lower switch 116 is then turned off, the upper switch 114 is turned on, but for a shorter period of time than the lower switch 116, resulting in asymmetric switching. The initial long turn on-time of the lower switch 116 (relative to the upper switch 114 turn on-time) allows the charge in the resonant capacitor 110 to charge a boot strap capacitor 156 through a rectifier 158, as well as to source current through the resonant inductance 108 and magnetizing inductance 126. The bootstrap capacitor 156 is used by the controller to drive the turn on of the upper switch 114 using a "floating" upper switch driver in the controller 112. Since the bootstrap capacitor 156 is connected to the half bridge node 115, when the lower switch 116 is turned on, essentially grounding the half bridge node 115, the bootstrap capacitor 158 is charged from the input voltage 122 through the rectifier 158. When the lower switch 116 is then shut off, the voltage across the bootstrap capacitor will be above that of the half bridge node 115. The upper switch 114 is turned on until the current through the inductances 108, 126 reaches a threshold level relative to the feedback signal 144, as indicated by the current sense signal 148. Since the feedback signal 144 will be low (having triggered the burst) the initial on-time of the upper switch 114 will be substantially shorter than that of the on-time for the lower switch 116. The asymmetric switching reduces switching losses and acoustic noise.

As the switching continues, the upper on-time 152 increases as the comparison of the feedback signal 144 and current sense signal 148 change with increasing output voltage at output 138. In some embodiments the feedback signal 144 can be inverted from that of the output 138 such that as the output 138 increases, the feedback signal 144 decreases, and vice versa. Under light load conditions, however, the feedback signal will indicate that the voltage at the output has again reached the skip-in threshold, which will be detected by the skip mode control circuit 150 via the feedback signal 144 during a time when the upper switch 114 is enabled. The skip mode control circuit 150 uses the present upper on-time 152 to form the next lower on-time 154, which will be a prolonged on-time relative to the most recent upper on-time 152 by some predetermined factor to ensure that the resonant capacitor 110 is discharged to the desired level before ceasing switching.

Figure 2:
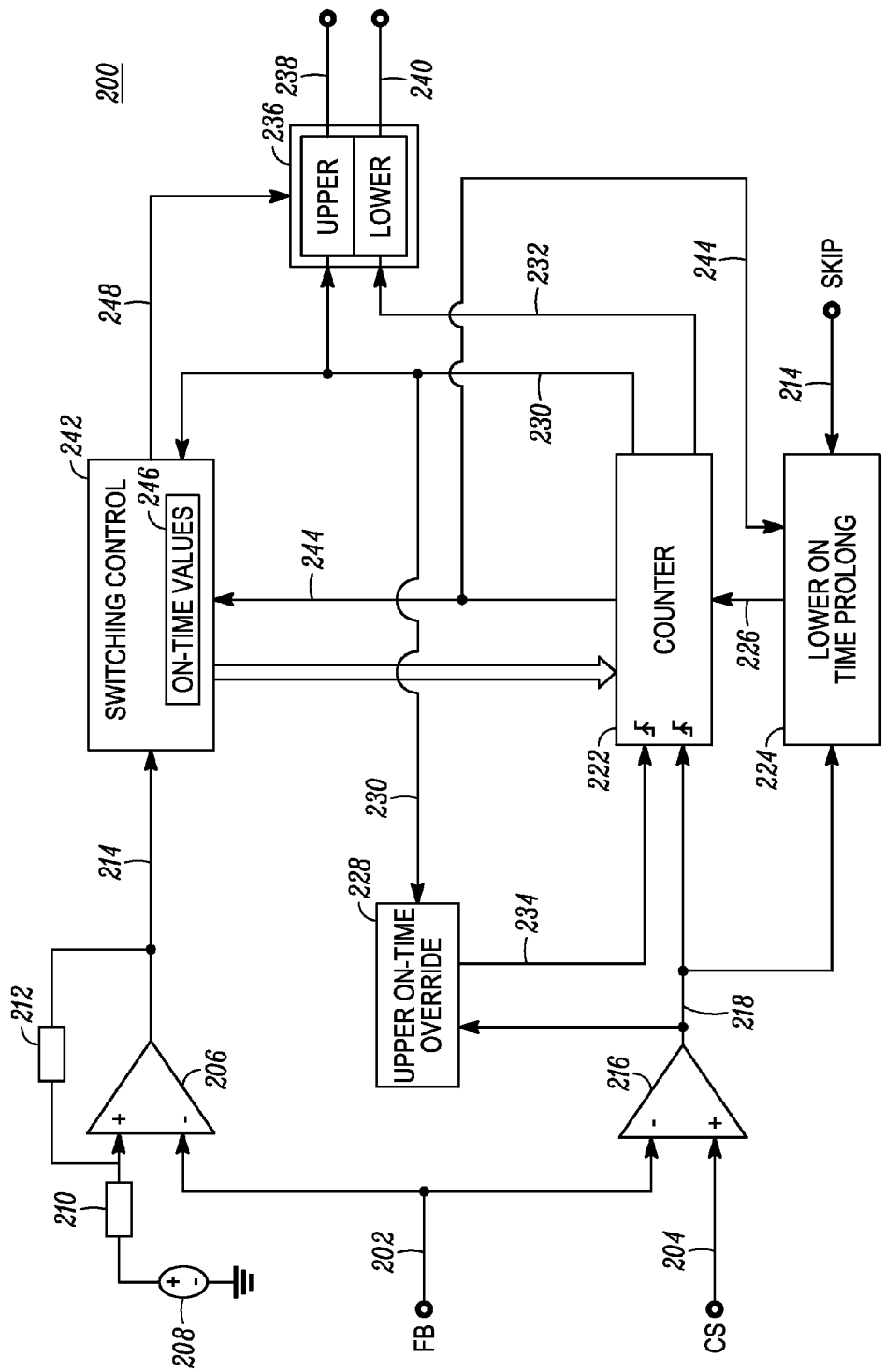
FIG. 2 shows a block circuit diagram of a skip mode control circuit for use in controlling skip mode operation in a resonant power converter, in accordance with some embodiments.

FIG. 2 shows a block circuit diagram of a skip mode control circuit 200 for use in controlling skip mode operation in a resonant power converter, in accordance with some embodiments. The skip mode control circuit 200 can be one possible embodiment of skip mode control circuit 150 of FIG. 1. The skip mode control circuit 200 receives as inputs a feedback signal 202 and a current sense signal 204. The feedback signal 202 corresponds inversely to the output voltage at a secondary side of the resonant power converter, and can be, for example, substantially similar to feedback signal 144 of FIG. 1. The current sense signal 204 corresponds to an integrated instantaneous value of current through a resonant capacitor of the resonant power converter, and can be, for example, substantially similar to current sense signal 148 of FIG. 1.

A skip mode comparator 206 compares the feedback signal 202 at an inverting input with a reference voltage at its non-inverting input to produce a skip signal 214 at its output. The reference voltage at the non-inverting input is derived from a voltage reference 208 and is modified to provide hysteresis by input resistor 210 and feedback resistor 212. The hysteresis points can correspond to the skip-in and skip-out thresholds. The skip signal 214 is provided to a switching control circuit 242. Since the feedback signal 202 varies inversely with the output voltage, it decreases as the output voltage increases. Thus, when the level of the feedback signal 202 drops below the voltage at the non-inverting input of the skip mode comparator 206, the skip signal 214 will be transition to a high level, which raises the voltage at the non-inverting input due to the hysteresis created by input resistor 210 and feedback resistor 212. Accordingly, the feedback signal 202 must rise, corresponding to a decreasing output voltage, above the voltage at which the skip mode comparator asserted the skip mode signal 214 to cause the skip mode comparator 206 to de-assert the skip mode signal 214. The hysteresis thresholds resulting from the voltage of the voltage reference 208, input resistor 210, feedback resistor 212, and the high and low levels of the skip signal 214 can be configured to correspond to the desired skip-in and skip-out thresholds. The lower hysteresis level where the skip mode comparator 206 asserts the skip mode signal 214 can correspond to the skip-in threshold, as described in reference to FIG. 1, which indicates the output voltage is at a high enough level to commence skip mode. Likewise, the hysteresis level where the skip mode comparator 206 transitions the skip signal 214 from a high level to a low level can correspond to the skip-out threshold, where the output voltage of the resonant power converter has dropped to a point where skip mode is to be ended.

An on-time comparator 216 compares the feedback signal 202 at its inverting input with the current sense signal 204 at its non-inverting input to produce an on-time comparator signal 218 as an output. When the secondary output voltage of the resonant converter is high, the feedback signal 202 will be lower, meaning less current through the resonant capacitor is needed to cause the on-time comparator signal 218 to be asserted, and when the secondary output voltage is low (as when there is a load), the current sense signal must be higher the cause the on-time comparator signal 218 to be asserted by the on-time comparator 216.

The on-time comparator signal 218 is provided to an on-time counter circuit 222, which responds to positive-going transitions of the on-time comparator signal 218. The on-time comparator signal 218 is also provided to an upper on-time override circuit 228 and a lower on-time prolong circuit 224. The on-time counter circuit 222 controls the on (and off) times for both the upper switch signal 230 and lower switch signal 232, and can provide anti-overlap control, or dead time, between the upper switch on-time and the lower switch on-time where neither the upper or lower switch signals 230, 232 are high, as is conventional in resonant power converters. The on-time counter circuit 222 can receive a count value or count values from the switching control circuit 242, and can include memory or register circuits for retaining and modifying count values as necessary. The on-time counter circuit 222 can also determine when the on-times for the upper and lower switch signals 230, 232 are equal, and provide a symmetric switching signal 244 to the switching control circuit 242. The on-time counter circuit can receive a prolong signal 226 from a lower on-time prolong circuit 224, which causes the on-time counter circuit 222 to prolong the on-time of the lower switch signal 232 relative to the on-time of the upper switch signal 230 by some factor, such as, for example, 50%.

The lower on-time prolong circuit 224 is responsive to both the skip signal 214 provided by the skip mode comparator 206 and the on-time comparator signal 218, and the symmetric switching signal 244. When the symmetric switching signal 244 is low, and both the skip signal 214 and on-time comparator signal 218 are asserted, the lower on-time prolong circuit 224 causes the on-time counter circuit 222 to prolong the on-time of the lower switch signal 232 for time that on-time comparator signal 218 is high.

The on-time counter 222 initiates the on-time of the upper switch signal 230 responsive to switching control circuit 242, and terminates the on-time of the upper switch signal 230 upon detecting a positive going transition at the output of either the on-time comparator 216 or the output 234 of the upper on-time override circuit 228. The upper on-time override circuit 228 includes memory or register elements to store a previous upper switch on-time (i.e. a count value), and compares the previous (i.e. most recent) on-time of the upper switch signal 230 with a present count, and when the present upper switch on-time count exceeds a preselected fraction of the previous on-time of the upper switch signal 230 while the on-time comparator signal 218 is high, the upper on-time override circuit 228 will assert the output 234 when the present count equals the previous on-time of the upper switch signal 230. Thus, the present upper switch on-time, as counted by the on-time counter circuit 222, is terminated when either the on-time comparator signal 218 is asserted during the upper switch on-time, or when the present upper switch on-time equals the most recent previous upper switch on-time and on-time comparator signal 218 stays high for preselected fraction of the previous on-time of the upper switch signal 230.

The on-time counter circuit 222 provides the upper switch signal 230 to an upper switch driver of a driver circuit 236, and the lower switch signal to a lower switch driver of the driver circuit 236. The upper switch driver produces an upper switch drive signal 238 that is analogous to upper driving signal on line 118 of FIG. 1, and a lower switch drive signal 240 that is analogous to the lower driving signal on line 120 of FIG. 1. The driver circuit 236 is enabled or disabled by the driver enable signal 248 provided by the switching control circuit 242. The switching control circuit disables the driver circuit 236 during skip mode operation after leaving the lower switch on for the prolonged time to discharge the resonant capacitor to the preselected voltage level. The switching control circuit 242 can also store and/or modify on-times 246 that are used by the on-time counter circuit 222 to time the upper and lower on-times of the upper and lower switch signals 230, 232.

Figure 3:
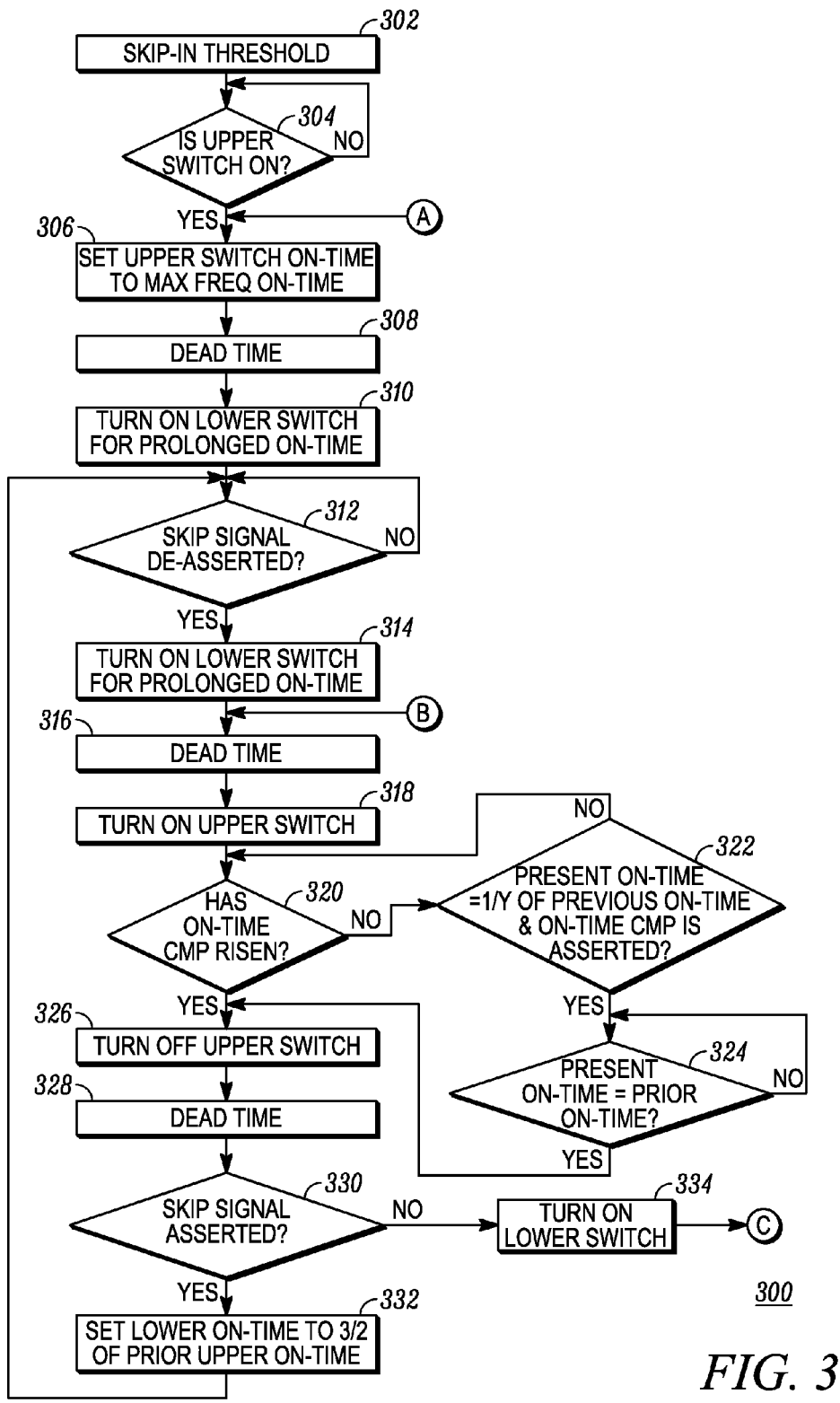
FIG. 3 is a flow chart diagram of a first portion of a method for skip mode operation, in accordance with some embodiments.
Figure 4:
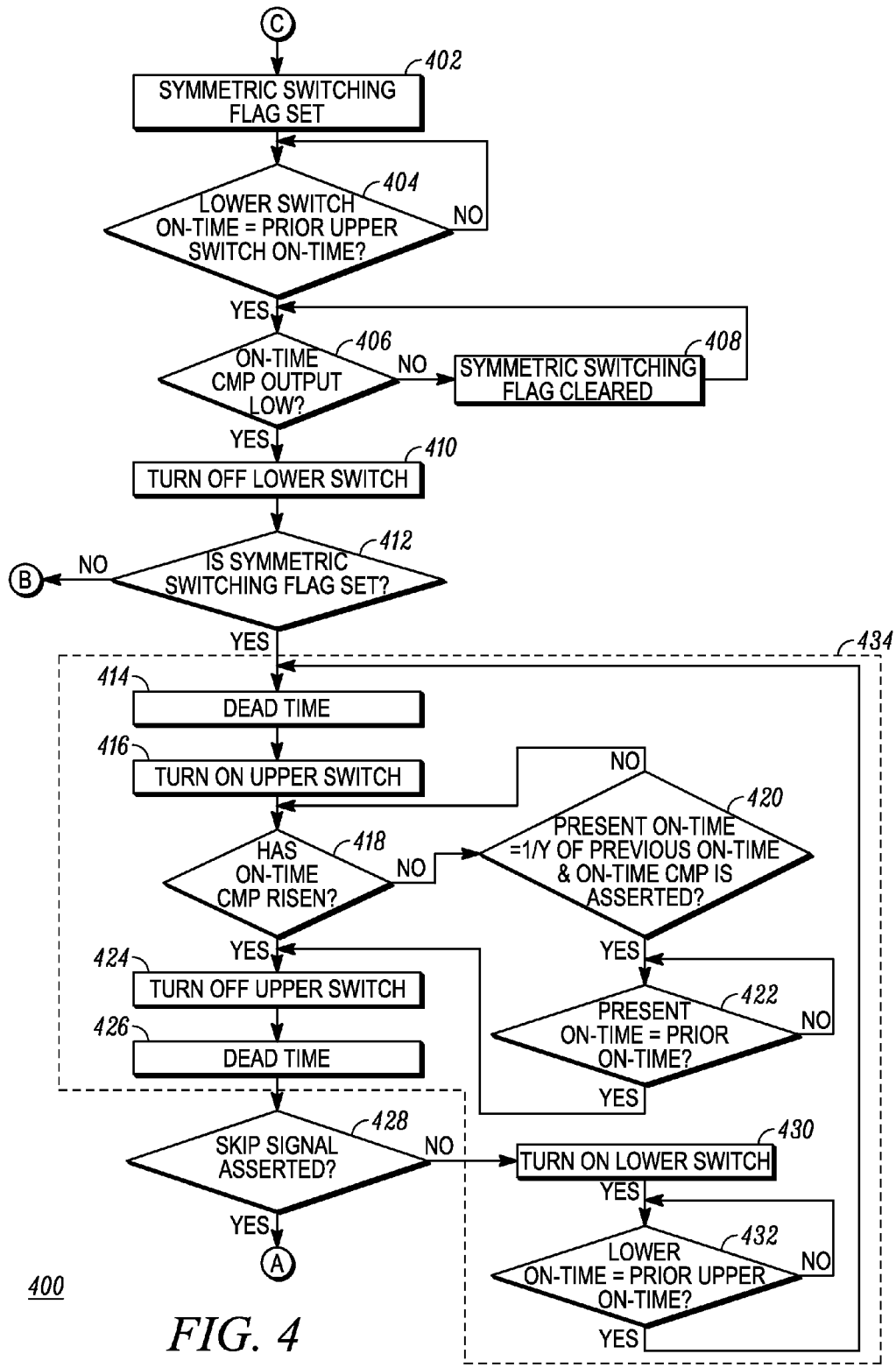
FIG. 4 is a flow chart diagram of a second portion of a method for skip mode operation, in accordance with some embodiments.

FIGS. 3-4 describe operation of a skip mode control circuit for a resonant power converter controller. The method of FIGS. 3-4 includes both the asymmetric switching of skip mode during light or no-load periods, as well as the transition to symmetric switching when a load is present at the output of the resonant power converter. The method described can be carried out and performed by embodiments in accordance with the resonant power converter 100 and controller 112 of FIG. 1, and the skip mode control circuit 200 of FIG. 2. Accordingly, terms used in describing the method of FIGS. 3-4 can refer to substantially similar structure and circuit elements shown in FIGS. 1-2.

FIG. 3 is a flow chart diagram of a first portion 300 of a method for skip mode operation, in accordance with some embodiments. The first portion 300 shows a majority of the skip mode of operation. Accordingly, the first portion 300 starts when the skip-in threshold is crossed by the output level in step 302, as can be indicated, for example, when the skip signal 214 is asserted by skip comparator 206 while comparing the feedback signal 202 to the modified reference voltage at its non-inverting input. The occurrence of the skip-in threshold being crossed is only used when the upper switch signal is on, as indicated in step 304. When the upper switch signal is on, the method proceeds to step 306 where the upper switch on time is set to the on-time corresponding to the maximum switching frequency used by the resonant power converter, and stored in the skip mode controller, such as one of the on-times 246 of the switching control circuit 242. In step 308 the upper switch is turned off and a dead time occurs where neither switch is on. The dead time occurs during transitions of the voltage at the half bridge node 115 from a low level to a high level, or vice versa. Following the dead time of step 308, the lower switch is then turned on in step 310 for a period of time that is prolonged over the upper switch on-time, which was set in step 306 to the maximum frequency on-time. In some embodiments the lower switch on-time is prolonged by a factor of 3/2, or 50%, over the upper switch on-time. The method proceeds out of step 310 at the end of the prolonged lower switch on-time, and the lower switch is then turned off, allowing the resonant capacitor to discharge to a predetermined level, which can be in some embodiments 25% of the input voltage level provided as an input voltage to the resonant power converter. At this point in the method both switches are off, and remain off until the feedback voltage exceeds the skip-out threshold in step 312 (e.g. skip signal 214 is de-asserted), indicating the secondary output voltage has fallen to a level that requires switching to resume.

Once switching needs to resume, the skip mode controller first turns on the lower switch for the prolonged on-time in step 314. The prolonged on-time can be 50% more than the on-time of the maximum frequency used for symmetric switching. Once the lower switch is turned off at the end of the prolonged on-time in step 314, another dead time occurs in step 316 as the half bridge node transitions from a low level to a high level. Then, in step 318, the upper switch is turned on and the on-time counter commences counting. The method then proceeds to step 320 where the method checks to see of the output of the on-time comparator (e.g. 218) has risen from a low level to a high level. While that transition of the on-time comparator output has not occurred, the method also checks to see if the present count of the on-time counter has reached some fraction (1/Y) of the prior upper switch on-time in step 322. If the on-time comparator output rises while the upper switch is on, the method proceeds to step 326 and the upper switch is shut off. Alternatively, in step 322, if the present on-time count reaches the preselected fraction of the prior upper switch on-time and on-time comparator output is asserted, the method proceeds to step 324 where the prior upper switch on-time is used to stop the present upper switch on-time count, and the method then proceeds to step 326 and the upper switch is shut off. Thus, once the upper switch is turned on in step 318, it is only shut off upon a transition of the on-time comparator output from a low to a high, or if the present on-time count reaches that of the previous upper switch on-time when on-time comparator output signal stays high for preselected fraction (1/Y) of the previous on-time of the upper switch signal.

Once the upper switch is shut off in step 326, a dead time occurs in step 328. The method then, in step 330, determines whether the skip-in threshold is crossed, and if it is, then the method proceeds to step 332 where the lower on-time is set to a prolonged on-time over the most recent upper switch on-time, and the method returns to step 312. If, however, in step 330, the skip-in threshold in not crossed, the method proceeds to step 334 where the lower switch is turned on and the on-time counter commences counting the lower switch on-time, which can be simply counting down from the count reached by the prior upper switch on-time count. The method then proceeds to the second portion 400 of the method in FIG. 4.

FIG. 4 is a flow chart diagram of a second portion 400 of a method for skip mode operation, in accordance with some embodiments. The second portion 400 of the method commences from step 334 to step 402 where the symmetric switching flag is set. In step 404 the on-time counter continues counting until the present lower switch on-time reaches the value of the prior upper switch on-time. In step 406, after the present lower switch on-time has reached the prior upper switch on-time, the method determines whether the output of the on-time comparator is low (e.g. 218). If the on-time comparator output is not low when the present lower switch on-time count reaches the value of the prior upper switch on-time, the symmetric switching flag is cleared in step 408 and the method waits until the output of the on-time comparator is de-asserted. Once the output of the on-time comparator falls in step 406, the lower switch is shut off in step 410. In step 412 the symmetric switching flag is evaluated. If it is clear, the resonant power converter is not ready to commence symmetric switching and the method returns to step 316. If the symmetric switching flag is set in step 412, then symmetric switching can commence in section 434, which is conventional, non-skip symmetric switching control of the upper and lower switches.

Subsequent to shutting off the lower switch in step 410, a dead time 414 occurs, and then the upper switch is turned on in step 416 and an upper switch on-time commences. The method then substantially repeats steps 320, 322, 324 in steps 418, 420, 422, respectively. Accordingly, the upper switch is shut off in step 424 when either the on-time comparator output transitions from low to high in step 418, or when the present upper switch on-time reaches the value of the most recent prior upper switch on-time in step 422, after meeting the criteria of step 420. Once the upper switch is shut off in step 424, the upper switch on-time is stored and a dead time 426 occurs. In a departure from conventional symmetric switching, the method checks to see if the skip-in threshold has been crossed in step 428. If the skip-in threshold is not crossed in step 428, conventional symmetric switching control continues and the lower switch is turned on in step 430 until the lower switch has been on for the same time as the prior upper switch on-time, as indicated in step 432, where the method returns to step 414. However, if in step 428 the skip-in threshold is crossed, it means skip mode control is to be resumed, and the method returns to step 306.

It should be noted that when skip mode control is first undertaken the lower switch on-time is set to a prolonged on-time, which is prolonged over the on-time of the most recent maximum symmetric switching frequency, as indicated in steps 306-310.

Figure 5:
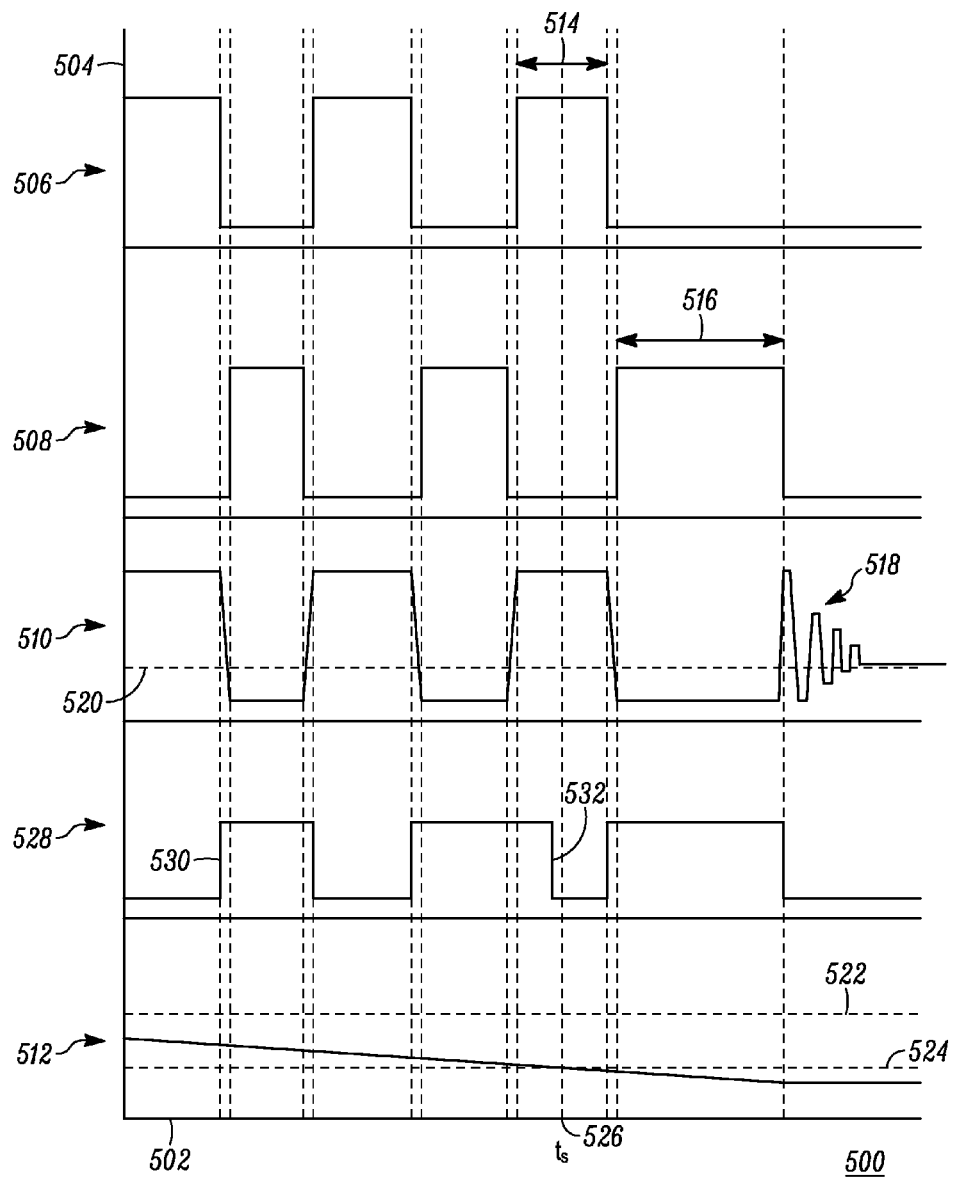
FIG. 5 is a timing diagram showing a shutdown sequence at the start of a skip mode of operation, in accordance with some embodiments.
Figure 6:
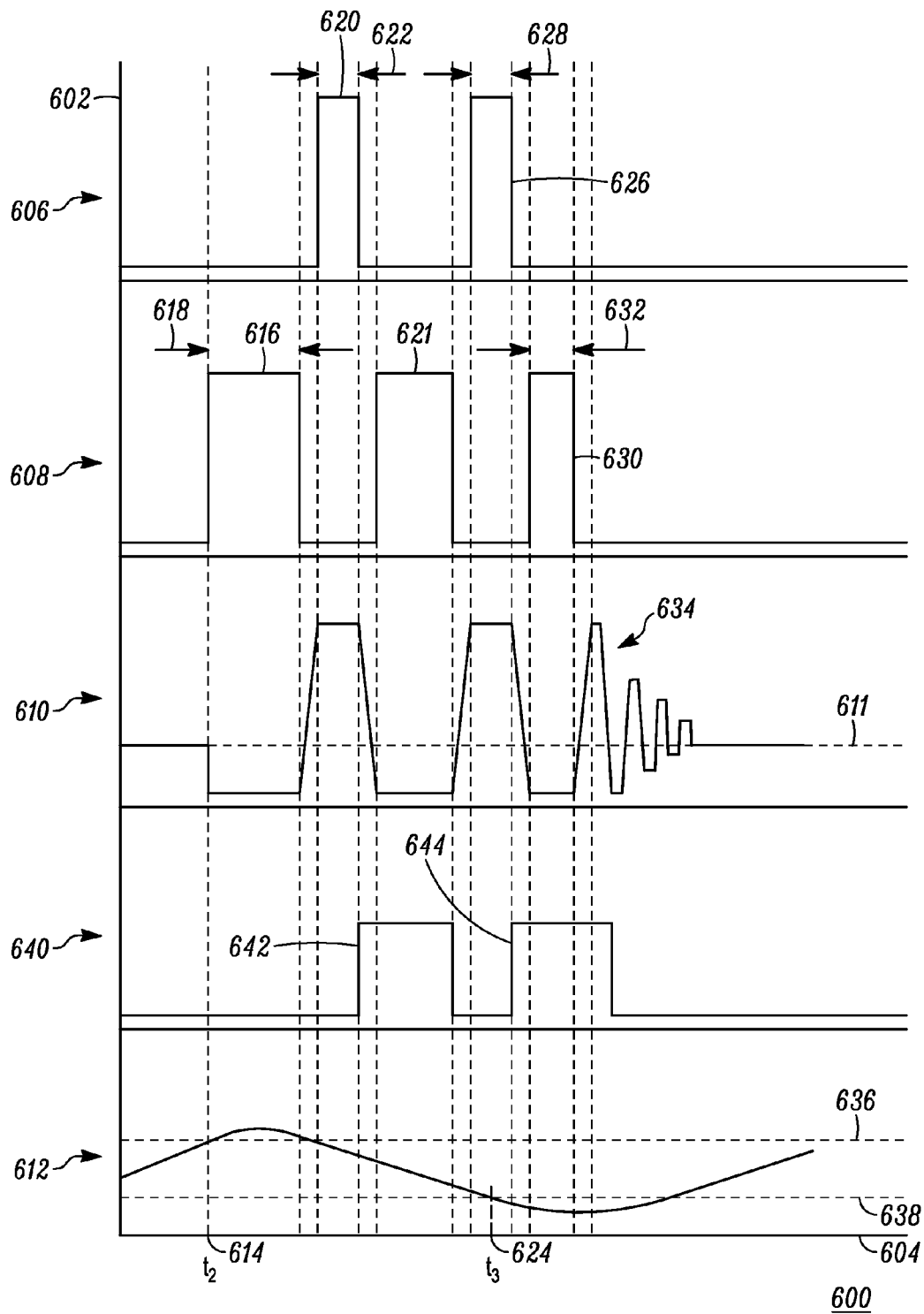
FIG. 6 is a timing diagram showing a startup sequence of a skip burst during a skip mode of operation, in accordance with some embodiments.
Figure 7:
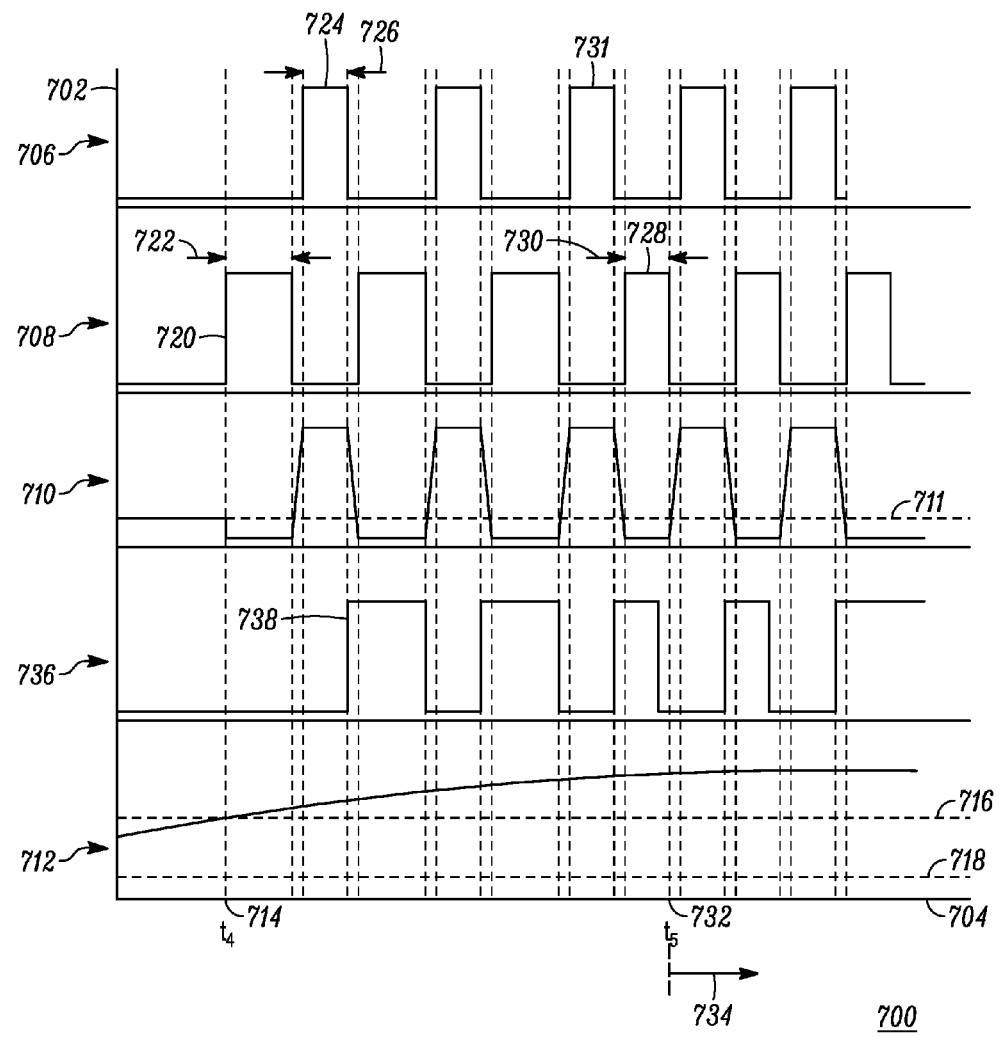
FIG. 7 is a timing diagram showing a startup sequence at the end of a skip mode of operation where normal operation is resumed, in accordance with some embodiments.

FIGS. 5-7 show various timing diagrams for entering skip mode, performing a skip burst during skip mode operation, and exiting skip mode, respectively. In these drawings the scale is not intended to imply any actual scale, rather the following description will, where significant, will explain relative scale. The signals illustrated are formed, for example, by circuits and logic structure consistent with that shown in FIGS. 1-2 performing the method of FIGS. 3-4.

FIG. 5 is a timing diagram showing a shutdown sequence 500 at the start of a skip mode of operation, in accordance with some embodiments. The horizontal axis 502 represents time and the vertical axis 504 represents signal level. The diagram shows an upper switch drive signal 506 and a lower switch drive signal 508, both of which are generated by a resonant converter controller such as controller 112. The upper switch drive signal 506 is used to drive an upper switch (e.g. 114 of FIG. 1) and the lower switch drive signal 508 is used to drive a lower switch (e.g. 116 of FIG. 1). When the upper and lower drive switch signals 506, 508 are high it means the respective switch is on and conducting. When the switch drive signals 506, 508 are low the respective switch is off and not conducting. Also shown is a half bridge signal 510 that corresponds to, for example, the signal at node 115 of FIG. 1. A feedback signal 512 is shown on the bottom of the diagram that can be, for example feedback signal 144 of FIG. 1. The feedback signal is inverted relative to the output level here, thus, as the output level rises the feedback signal decreases, and as the output level drops the feedback signal increases. A lower bound 524 represents an skip-in threshold at the output, which is the output level at which the resonant converter can operate in skip mode. And upper bound 522 represents a skip-out threshold at the output, and when the output level falls below it (causing the feedback signal 512 to rise above upper bound 522) the a burst can be initiated which may or may not continue into symmetric operation, if the load has substantially increased. The output of an on-time comparator 528 (e.g. 218) is also shown.

The upper switch drive signal 506 is shut of responsive to the on-time comparator output 528 rising, such as at rising edge 530. Prior to time $t_s$ 526 the upper switch drive signal 506 and the lower switch drive signal are symmetric, as is the half bridge signal 210. The feedback signal 512 is falling, indicating the output level (e.g. the level at output 138 of FIG. 1) is increasing. The on-time comparator output 528 falls at falling edge 532 before time $t_s$ 526 when the feedback signal exceeds the lower bound 524, indicating the output level has crossed the skip-in threshold The excursion of the feedback signal beyond the lower bound 524 happens to occur in this example during an on-time of the upper switch drive signal 506. If the excursion happened during the on-time of the lower switch drive signal prior to time $t_s$ 526, the excursion is not detected until the next upper switch drive signal on-period. The upper switch drive signal pulse at time $t_s$ 526 has an on-time 514. Since the feedback signal 512 has exceeded the lower bound 524, it indicates a light or no load condition at the output and accordingly, the resonant converter would be operating at a maximum switching frequency at time $t_s$ 526. Thus, the on-time 514 is the on-time used at the maximum switching frequency.

When the controller detects the feedback signal 512 excursion, the next lower switch drive signal one time 516 is extended, such as by a 50% increase of the last upper switch drive signal on-time 514. When the extended lower switch drive signal on-time 516 ends, the upper switch is not switched on, thus upper switch drive signal 506 remains low. As a result, there is ringing 518 at the half bridge signal 510, and the half bridge signal 510 settles at a voltage level 520 that is some significant fraction of the input voltage, and can be, for example 25% of the input voltage. The voltage level 520 is the voltage across the resonant capacitor (e.g. 110 of FIG. 1) at a steady state. Thus, when the feedback signal indicates skip mode the controller commences a shutdown sequence where the switching of the upper switch is ceased, then the lower switch is drive on for a prolonged period to charge the resonant capacitor, and then no more switching occurs while the output remains above a skip-out threshold.

FIG. 6 is a timing diagram showing a startup sequence 600 of a skip burst during a skip mode of operation, in accordance with some embodiments. As in FIG. 5, the vertical axis 602 represent signal level and the horizontal axis 604 represents time. The diagram shows an upper switch drive signal 606, and lower switch drive signal 608, a half bridge signal 610, an on-time comparator output 640, and a feedback signal 612. Initially the half bridge signal is at level 611, which is, for example, 25% of the input voltage provided to the resonant power converter, as set by the previous burst or shutdown sequence (e.g. FIG. 5). At time $t_2$ 614, the feedback signal 612 exceeds the upper bound 636, indicating the output level of the secondary output has dropped below a skip-out threshold and needs to be refreshed. As a result, the controller turns on the lower switch first, in pulse 616 of the lower switch drive signal 608. The duration 618 is based on the last upper switch drive signal on-time, which is stored in the controller, and is prolonged over the last upper switch drive signal on-time. In some embodiments, the duration 618 is 50% longer than the most recent symmetrically switching (i.e. maximum frequency) upper switch drive signal on-time, before switching was ceased previously. During the lower switch drive signal on-time in pulse 616, the half bridge signal is essentially zero, and current flows through the resonant inductance and magnetizing inductance from the partially charged resonant capacitor. The lower switch drive signal pulse 616 is applied to charge the bootstrap capacitor (e.g. 156). After the pulse 616 ends, the upper switch drive signal is driven high to turn on the upper switch in pulse 620, subsequent to the half bridge signal 610 rises to the input voltage. The duration 622 of the pulse 620 is shorter than that of pulse 616, and could be less than the previous on-time of the last upper switch drive signal on-time. The turn off of the pulse 620 is based, in some embodiments, on the rising edge 642 of the on-time comparator output 640. After pulse 620, the lower switch drive signal 608 is again turned on in pulse 621, and by this time the feedback signal 612 starts to decrease as the output voltage of the secondary output increases. The duration of pulse 621 is longer than that of the previous upper switch on-time 620 because of the asserted on-time comparator output signal 640. The pulse 621 of the lower switch driver signal 608 is terminated when on-time comparator output 640 is de-asserted. The lower switch driver signal 608 is prolonged due to the asserted on-time comparator output 640 until symmetrical switching is achieved. It should be noted that the burst pulse sequence shown here is greatly reduced in terms of the number of pulses that would ordinarily occur during a burst in skip mode operation. At time $t_3$ 624, during pulse 626 of upper switch drive signal 606, the feedback signal 612 decreases below the lower bound 638, indicating the output level of the secondary output has exceeded the skip-in threshold. The pulse 626 could have a slightly longer duration that the previous pulse 620, in some embodiments, and ends upon the rising edge 644 of the on-time comparator output 640. In response to the feedback signal 612 exceeding the lower bound 638, the skip signal (e.g. 214) will be asserted, the lower switch drive signal 608 is asserted in pulse 630 for a period of time that is prolonged relative to the last pulse 626 of the upper switch drive signal 606 and duration of pulse 630 is not affected by on-time comparator output signal. When pulse 630 ends, the half bridge signal 610 will ring 634 and settle at level 611, which can be, for example, 25% of the input voltage. After the end of pulse 630 switching is ceased until the next feedback signal 612 exceeds the upper bound 636 which corresponds to the skip-out threshold of the secondary output voltage.

FIG. 7 is a timing diagram showing a startup sequence 700 at the end of a skip mode of operation where conventional symmetric switching operation is resumed, in accordance with some embodiments. The vertical axis 702 represent signal level and the horizontal axis 704 represents time. The sequence 700 includes upper switch drive signal 706, lower switch drive signal 708, half bridge signal 710, on-time comparator output 736, and feedback voltage 712. In the sequence 700 the resonant converter is initially in a skip mode (e.g. no switching activity) due to a light load condition at the output of the converter, but during the sequence 700 the load is substantially increased. Accordingly, prior to time $t_4$ 714, no switching is occurring, and the feedback signal 712 is above the lower bound 718 but below the upper bound 716. The half bridge signal 710 remains at the voltage of the resonant capacitor. At time $t_4$ 714 the feedback signal 712 exceeds the upper bound 716, which corresponds to a skip-out threshold at the secondary output, indicating the secondary output level is falling, and the lower switch drive signal 708 is turned on in pulse 720, which has a duration 722 that is a duration that is increased over the last upper switch drive signal on-time of the most recent maximum symmetric switching frequency by a preselected factor (e.g. 50%). After pulse 720 ends, the upper switch drive signal 706 is asserted in pulse 724, for a duration 726 that is shorter than pulse 720, and which is terminated on rising edge 738 of the on-time comparator output 736. After pulse 724, the lower switch drive signal 708 is again turned on for a longer time than previous upper switch pulse 724 because of the asserted on-time comparator output signal 736. The lower switch drive signal 708 is terminated when on-time comparator output signal 736 is de-asserted. The lower switch driver signal 708 is prolonging by asserted on-time comparator output 736 until symmetrical switching is achieved. The symmetrical switching is achieved during pulse 728 of lower switch drive signal 708, when on-time comparator output 736 is de-asserted before the lower switch on-time equals the respective previous upper switch on-time duration of pulse 731. Thus, after time $t_5$ 732 the upper switch drive signal 706 and lower switch drive signal 708 have the same on-time, i.e. they are switching symmetrically and prolonging of the lower switch signal 708 on-times based on the on-time comparator output 736 is ended until, for example, skip signal 214 of FIG. 2 is asserted again at some time in the future (not shown). Arrow 734 indicates that conventional symmetric switching occurs after time $t_5$ 732. After time $t_4$ 714 the skip signal (e.g. 214) is de-asserted and remains so for the rest of sequence 700.

Figure 8:
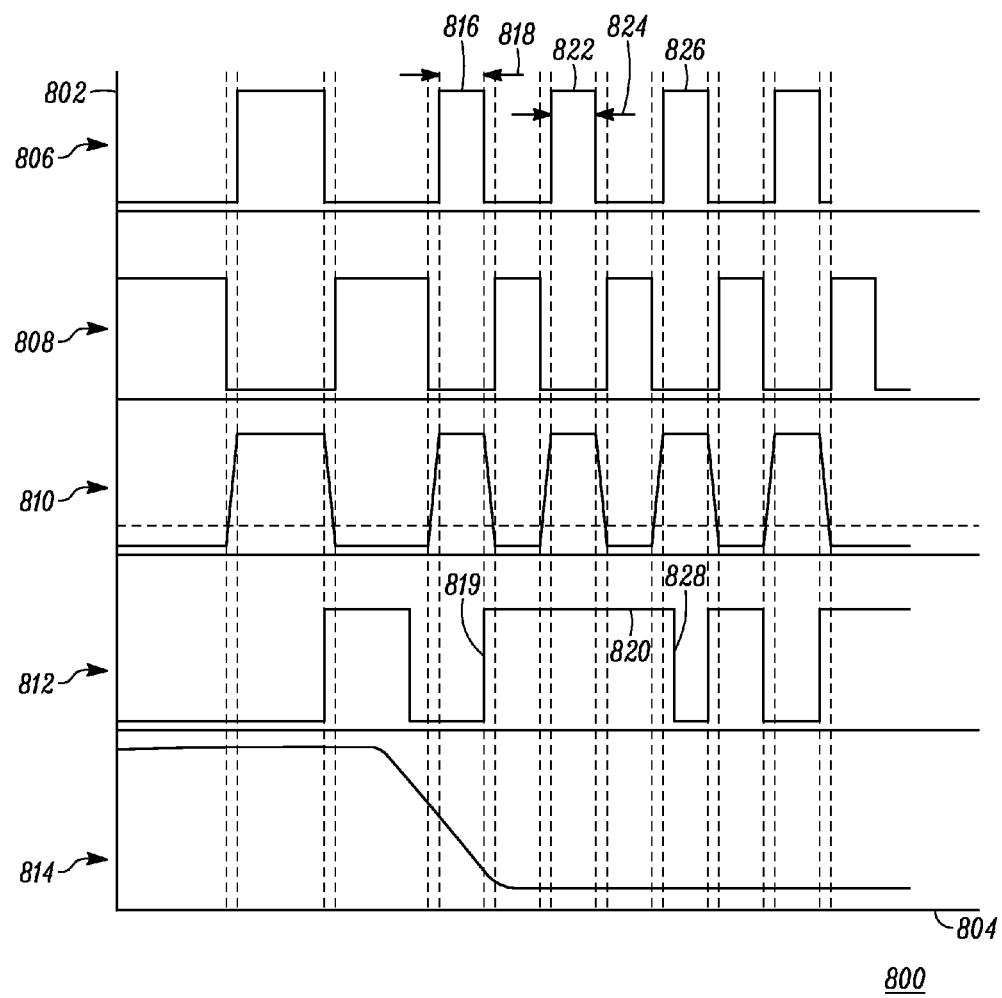
FIG. 8 shows a timing diagram of operation of a skip mode controller during a skip sequence, in accordance with some embodiments.

FIG. 8 shows a timing diagram of operation of a resonant converter controller during a normal operation or skip sequence 800, in accordance with some embodiments. The diagram shows signal levels on the vertical axis 802, and time on the horizontal axis 804, and includes an upper switch drive signal 806, and lower switch drive signal 808, a half bridge signal 810, an on-time comparator output 812, and a feedback voltage 814. The operation illustrated here corresponds to the steps 320-324 of FIG. 3 and steps 418-422 of FIG. 4. In particular, a pulse 816 of the upper switch drive signal 806 has a duration 818, and terminates on the rising edge 819 of the on-time comparator output 812. However, during pulse 822 of upper switch drive signal, the on-time comparator output 812 remains high due to feedback voltage 814 dropping. If on-time comparator output 812 remains high for a preselected portion of the previous upper drive signal pulse on-time, a present upper drive signal pulse is terminated when its duration 824 reaches the duration of the on-time of prior pulse 816, as shown, for example in steps 320-324 of FIG. 3 and steps 418-422 of FIG. 4. This method of terminating the upper switch pulse on-time is used in some cases where the rising edge of on-time comparator output does not occur and terminate actual upper drive signal on-time since it remains asserted. However the on-time comparator output 812 in the present example can fall to a low level at edge 828 before the comparison time 1/Y of steps 322, 420, for example, during pulse 826. As a result pulse 826 is terminated on the rising edge of on-time comparator output 812. This feature can be active at all switching modes of the resonant converter controller (i.e. during skip mode also during normal operation).

Accordingly, some embodiments can include a semiconductor product that includes control circuitry for a resonant converter that includes a feedback comparator that asserts a skip signal when a feedback signal indicates an output of the resonant converter crosses a skip-in threshold and de-asserts the skip signal when the feedback signal indicates the output has crossed a skip-out threshold. The skip control circuitry, responsive to the skip signal being asserted during an upper switch on-time, prolongs a lower switch on-time relative to the upper switch on-time for a lower switch drive signal, and when the prolonged lower switch on-time ends, the skip control circuitry stops further switching until the skip signal is de-asserted. When the skip signal is de-asserted, the skip control circuitry turns on the lower switch drive signal for the prolonged time. The skip control circuitry, at the end of the prolonged time, can start an upper switch on-time timer and turn on the upper switch drive signal until either the output of an on-time comparator has been asserted or the upper switch on-time timer reaches a time equal to a most recent upper switch on-time when the on-time comparator output remains asserted for preselected fraction of the previous on-time of the upper switch signal. The on-time comparator compares the feedback signal with a current sense signal to generate the on-time comparator output. At the end of the upper switch on time, when the skip signal is asserted, the skip control circuitry sets the next lower switch on-time to be prolonged over the upper switch on-time, meaning the most recent upper switch on-time. In other cases when, at the end of the upper switch on time and when the skip signal is de-asserted, the skip control circuitry starts a lower on-time counter and turns on the lower switch drive signal until, after the lower switch on-time counter has reached the upper switch on-time, the output of the on-time comparator is de-asserted. When the output of the on-time comparator is de-asserted and the lower switch on-time is equal to the upper switch on-time, the skip control circuitry commences symmetric switching operation. Alternatively, when the skip control circuitry sets the lower switch on-time to the prolonged on-time, the skip control circuitry turns on the lower switch drive signal for the prolonged time, for the time when the on-time comparator output is asserted and at the end of the prolonged on-time, starts an upper switch on-time timer and turns on the upper switch drive signal until either the output of an on-time comparator has been asserted or the upper switch on-time timer reaches a time equal to a most recent upper switch on-time when the on-time comparator output remains asserted for preselected fraction of the previous on-time of the upper switch signal. Some embodiments include a resonant converter that includes control circuitry in accordance with the circuitry of the semiconductor product.

The disclosed embodiments therefore solve the problems associated with the prior art, such as hard switching when entering and exiting skip periods by ceasing switching in a way that leaves the resonant capacitor charged to a preselected voltage, and upon resuming switching, using an asymmetric switching control where the lower switch is always turned on first, allowing current from the resonant capacitor to pass through the resonant inductance and primary inductance for zero voltage switching, and where the on-time of the upper switch is controlled by the rising edge of the output of an on-time comparator that compares the feedback voltage and a current sense signal. Using the asymmetric switching during light load conditions also reduces acoustic noise generated by the transformer. By avoiding the hard switching associated with conventional skip mode, where symmetric switching is alternatively enabled or disabled, the switching transistors of the upper and lower switches do not have to be selected to withstand the hard switching.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description as part of the original disclosure, and remain so even if cancelled from the claims during prosecution of the application, with each claim standing on its own as a separately claimed subject matter. Furthermore, subject matter not shown should not be assumed to be necessarily present, and that in some instances it may become necessary to define the claims by use of negative limitations, which are supported herein by merely not showing the subject matter disclaimed in such negative limitations.

We claim:

1. A method of operating a controller for an LLC resonant converter having an upper switch coupled between a high voltage input and a half bridge node, a lower switch coupled between the half bridge node and an input ground, a resonant inductor, magnetizing inductor, and resonant capacitor coupled in series between the half bridge node and the input ground, the method comprising:
   receiving, at the controller, a feedback signal from a secondary side of the LLC resonant converter that indicates a level of an output voltage;
   initiating a skip sequence responsive to the feedback voltage indicating that the output voltage has exceeded a skip-in threshold, the skip sequence includes ending switching by driving the lower switch on for an extended period, relative to a recent on-time for the upper switch, to discharge the resonant capacitor to a fraction of the high voltage input, and shutting off the lower and upper switches wherein driving the lower switch on first for the extended period of time charges a bootstrap capacitor used by the controller to switch on the upper switch; and
   resuming a switching sequence responsive to the feedback voltage indicating that the output voltage has fallen below a skip-out threshold, the switching sequence including driving the lower switch on for the extended period of time prior to driving the upper switch on and then alternately switching the upper and lower switches.

2. The method of claim 1, wherein ending switching in the initiating the skip sequence comprises driving the lower switch on for the extended period causing the resonant capacitor to be discharged to one quarter of the input voltage.

3. A method of operating a controller for an LLC resonant converter having an upper switch coupled between a high voltage input and a half bridge node, a lower switch coupled between the half bridge node and an input ground, a resonant inductor, magnetizing inductor, and resonant capacitor coupled in series between the half bridge node and the input ground, the method comprising:
   receiving, at the controller, a feedback signal from a secondary side of the LLC resonant converter that indicates a level of an output voltage;
   initiating a skip sequence responsive to the feedback voltage indicating that the output voltage has exceeded a skip-in threshold, the skip sequence includes ending switching by driving the lower switch on for an extended period, relative to a recent on-time for the upper switch, to discharge the resonant capacitor to a fraction of the high voltage input, and shutting off the lower and upper switches; and
   resuming a switching sequence responsive to the feedback voltage indicating that the output voltage has fallen below a skip-out threshold, the switching sequence including driving the lower switch on first for the extended period of time and then alternately switching the upper and lower switches and wherein resuming the switching sequence comprises alternately switching the upper and lower switches in an asymmetric manner where an on-time of the upper switch is initially shorter than an on-time of the lower switch, and wherein the on-time of the upper switching is increased each switching cycle until either the on-time of the upper and lower switches are the same or the controller resumes skip mode responsive to the feedback voltage exceeding the skip-in threshold.

4. The method of claim 1, wherein initiating the skip sequence comprises driving the lower switch on for a period that is 50% longer than an on-time of the upper switch at a maximum frequency of the converter.

5. The method of claim 1, wherein initiating the skip mode and resuming switching are repeated during a light load condition at the output of the secondary side of the converter.

6. The method of claim 3, wherein the on-time of the upper switch is based on a comparison of the feedback voltage and a current level signal indicating a current level through the magnetizing inductance.

7. The method of claim 6, wherein the current level signal is integrated before comparing it with the feedback voltage.

8. A semiconductor product including control circuitry for a resonant converter, comprising:
   a feedback comparator that asserts a skip signal when a feedback signal indicates an output of the resonant converter crosses a skip-in threshold and de-asserts the skip signal when the feedback signal indicates the output has crossed a skip-out threshold;
   skip control circuitry that, responsive to the skip signal being asserted during an upper switch on-time, prolongs a lower switch on-time relative to the upper switch on-time for a lower switch drive signal, and when the prolonged lower switch on-time ends, stops further switching of the upper and lower switches until the skip signal is de-asserted wherein the skip control circuitry, when the skip signal is de-asserted, turns on the lower switch drive signal for the prolonged lower switch on-time prior to turning on the upper switch drive signal wherein the skip control circuitry, at the end of the prolonged time, starts an upper switch on-time timer for a present upper switch on-time and turns on the upper switch drive signal until either the output of an on-time comparator has been asserted or the upper switch on-time timer reaches a time equal to a most recent upper switch on-time while the on-time comparator remains asserted for a preselected fraction of a previous on-time of the upper switch signal, wherein the on-time comparator compares the feedback signal with a current sense signal;
   at the end of the present upper switch on time, when the skip signal is asserted the skip control circuitry sets the next lower switch on-time to be prolonged over the present upper switch on-time; and
   the skip control circuitry at the end of the present upper switch on time, when the skip signal is de-asserted, starts a lower on-time counter and turns on the lower switch drive signal until, after the lower switch on-time counter has reached the present upper switch on-time and the output of the on-time comparator is de-asserted or until the on-time comparator output is asserted.

9. The semiconductor product of claim 8, wherein the skip control circuitry, when the output of the on-time comparator is de-asserted and the lower switch on-time is equal to the upper switch on-time, the skip control circuitry commences symmetric switching operation.

10. The semiconductor product of claim 8, wherein the skip control circuitry sets the lower switch on-time to the prolonged lower switch on-time, the skip control circuitry turns on the lower switch drive signal for the prolonged lower switch time and at the end of the prolonged lower switch on-time, starts an upper switch on-time timer and turns on the upper switch drive signal until either the output of an on-time comparator has been asserted or the upper switch on-time timer reaches a time equal to a most recent upper switch on-time while the on-time comparator remains asserted for a preselected fraction of the previous on-time of the upper switch signal.

11. The semiconductor device of claim 8, wherein the prolonged lower switch on-time is approximately 3/2 of the upper switch on-time.

12. A resonant converter, comprising:
   an upper switch coupled in series with a lower switch between a positive input line and a ground line, forming a half bridge node where the upper switch and lower switch are connected together, the half bridge node configured for coupling to a tank circuit including an inductance coupled in series with a resonant capacitance between the half bridge node and the ground line;
   control circuitry that configured to alternately pulse the upper switch during an upper switch on-time and pulse the lower switch during a lower switch on-time, and including a feedback comparator that asserts a skip signal when the feedback signal indicates an output of the resonant converter crosses a skip-in threshold and de-asserts the skip signal when the feedback signal indicates the output has crossed a skip-out threshold;
   skip control circuitry that, responsive to the skip signal being asserted during the upper switch on-time, prolongs the lower switch on-time relative to the upper switch on-time for a lower switch drive signal, and when the prolonged lower switch on-time ends, stops further switching of the upper and lower switches until the skip signal is de-asserted;
   the skip control circuitry, at the end of the prolonged lower switch on-time, starts an upper switch on-time timer and turns on the upper switch drive signal until either the output of an on-time comparator has been asserted or the upper switch on-time timer reaches a time equal to a most recent upper switch on-time while the on-time comparator output remains asserted for a preselected fraction of a previous on-time of the upper switch signal, wherein the on-time comparator compares the feedback signal with a current sense signal;
   at the end of the upper switch on time, when the skip signal is asserted the skip control circuitry sets the next lower switch on-time to be prolonged over the upper switch on-time; and
   at the end of the upper switch on time, when the skip signal is de-asserted the skip control circuitry starts a lower on-time counter and turns on the lower switch drive signal until, after the lower switch on-time counter has reached the upper switch on-time while the output of the on-time comparator is de-asserted, or until the on-time comparator output is asserted.

13. The resonant converter of claim 12, wherein the skip control circuitry, when the skip signal is de-asserted, turns on the lower switch drive signal for the prolonged lower switch on-time prior to turning on an upper switch drive signal.

14. The resonant converter of claim 12, wherein the skip control circuitry, when the output of the on-time comparator is de-asserted and the lower switch on-time is equal to the upper switch on-time, the skip control circuitry commences symmetric switching operation.

15. The resonant converter of claim 12, wherein the skip control circuitry sets the lower switch on-time to the prolonged on-time, the skip control circuitry turns on the lower switch drive signal for the prolonged lower switch time and at the end of the prolonged lower switch on-time, starts an upper switch on-time timer and turns on the upper switch drive signal until either an output of an on-time comparator has been asserted or the upper switch on-time timer reaches a time equal to a most recent upper switch on-time while the on-time comparator output remains asserted for a preselected fraction of a previous on-time of the upper switch signal.

16. The resonant converter of claim 8, wherein the prolonged time is 3/2 of the upper switch on-time.

* * * * *